United States Patent
Iguchi et al.

(10) Patent No.: US 6,270,596 B1
(45) Date of Patent: Aug. 7, 2001

(54) PROCESS FOR PRODUCING HIGH STRENGTH SHAFT

(75) Inventors: Makoto Iguchi; Motohiro Nishikawa, both of Himeji; Masayoshi Saga, Mohka, all of (JP)

(73) Assignees: Sanyo Special Steel., Ltd., Hyogo-ken; Honda Motor Co., Ltd., Tokyo-to, both of (JP)

( * ) Notice: Subject to any disclaimer, the term of this patent is extended or adjusted under 35 U.S.C. 154(b) by 0 days.

(21) Appl. No.: 09/418,829

(22) Filed: Oct. 15, 1999

(51) Int. Cl.$^7$ ..................................................... C22C 38/00
(52) U.S. Cl. ........................ 148/572; 148/590; 148/593; 148/328
(58) Field of Search ..................................... 148/572, 575, 148/590, 593, 328

(56) References Cited

U.S. PATENT DOCUMENTS 5,803,993   9/1998   Yoshida et al. ...................... 148/320

FOREIGN PATENT DOCUMENTS 62-112727 * 5/1987 (JP) .
10195589   7/1998 (JP) .

* cited by examiner

*Primary Examiner*—Sikyin Ip
(74) *Attorney, Agent, or Firm*—Birch, Stewart, Kolasch & Birch, LLP

(57) ABSTRACT

Disclosed is a process for producing a shaft having improved strength without sacrificing machinability and cold workability. The process for producing a high strength shaft comprises the steps of: rolling or forging an alloy at a heating temperature of $Ac_3$ to 105° C. with a reduction in area of not less than 30%, the alloy comprising by weight carbon: 0.47 to 0.55%, silicon: 0.03 to 0.15%, manganese: 0.20 to 0.50%, molybdenum: 0.08 to 0.30%, sulfur: 0.005 to 0.035%, boron: 0.0005 to 0.005%, titanium: 0.05 to 0.20%, nitrogen: not more than 0.01%, aluminum: 0.005 to 0.05%, and manganese+molybdenum: 0.45 to 0.70% with the balance consisting of iron and unavoidable impurities, thereby producing a steel product having a hardness after rolling or forging of 85 to 97 HRB; and induction hardening the steel product to obtain a shaft, as shown in FIG. 1, having a hardening depth ratio (distance from the surface to a position of 500 HV/radius of component) of not less than 0.25 and an austenitic grain size number as specified in JIS G 0551 of not less than 7.

2 Claims, 1 Drawing Sheet

PROCESS FOR PRODUCING HIGH STRENGTH SHAFT

TECHNICAL FIELD OF THE INVENTION

The present invention relates to a process for producing a boron-containing shaft having improved machinability, cold workability, inducing hardenability, and torsional strength, and more particularly to a process for producing a shaft, such as a drive shaft of automobiles.

BACKGROUND OF THE INVENTION

In order to realize a reduction in production cost and an improvement in fuel consumption, there is a demand for a reduction in weight of components through an improvement in steels corresponding to S40C (JIS (Japanese Industrial Standards)) which have hitherto been used as steels for shafts of automobiles. To this end, a further increase in strength is required of S40C.

For example, Japanese Patent Publication No. 32946/1996 discloses a boron steel having improved machinability and cold workability, wherein, as compared with S40C, the content of silicon and the content of manganese have been reduced and the hardenability has been compensated for by boron. This steel has a carbon content of not more than 0.45% by weight which is on the same level of the content of carbon in S40C. Therefore, this steel has not been intentionally attempted to increase the strength of S40C.

In order to increase the strength, it is necessary to further increase the carbon content. Studies conducted by the present inventors, however, have revealed that a carbon content of not less than 0.47% by weight causes transition of fracture mode from ductile fracture to brittle (intergranular) fracture in a torsional strength test, inhibiting the improvement of the torsional strength.

Thus, in order to increase the torsional strength, it is necessary to increase the carbon content. Increasing the carbon content, however, brings about transition of fracture mode from ductile fracture to brittle fracture, inhibiting the improvement of the torsional strength. Therefore, the brittle fracture should be inhibited in order to improve the torsional strength.

DISCLOSURE OF THE INVENTION

In this description, JIS grain size classifications are defined according to Table A below.

TABLE A

| JIS Grain Size Classification | | |
| --- | --- | --- |
| Grain Size Number (N) | Number of Crystal Grains in Area of 1 mm$^2$ (n) | Average Sectional Area of Crystal Grain (mm$^2$) |
| −3 | 1 | 1 |
| −2 | 2 | 0.5 |
| −1 | 4 | 0.25 |
| 0 | 8 | 0.125 |
| 1 | 16 | 0.0625 |
| 2 | 32 | 0.0312 |
| 3 | 64 | 0.0156 |
| 4 | 128 | 0.00781 |
| 5 | 256 | 0.00390 |
| 6 | 512 | 0.00195 |
| 7 | 1024 | 0.00098 |
| 8 | 2048 | 0.00049 |
| 9 | 4096 | 0.000244 |
| 10 | 8192 | 0.000122 |

The number (n) of austenite crystal grains in a unit sectional area of 1 mm$^2$ is represented by $n=2^{N+3}$, wherein N denotes grain size number. (Japanese Industrial Standard, Category No. G, 0551-1997.)

The present inventors have found additive elements, which are important for inhibiting the brittle fracture, particularly molybdenum, and the amount thereof added, while taking into consideration the machinability and cold workability.

Accordingly, it is an object of the present invention to provide a process for producing a shaft having improved strength without sacrificing the machinability and cold workability of S40C.

Thus, according to one aspect of the present invention, there is provided a process for producing a high strength shaft, comprising the steps of:

rolling or forging an alloy as a starting material at a heating temperature of AC$_3$ to 1050° C. with a reduction in area of not less than 30%, said alloy comprising by weight carbon: 0.47 to 0.55%, silicon: 0.03 to 0.15%, manganese: 0.20 to 0.50%, molybdenum: 0.08 to 0.30%, sulfur: 0.005 to 0.035%, boron: 0.0005 to 0.005%, titanium: 0.05 to 0.20%, nitrogen: not more than 0.01%, aluminum: 0.005 to 0.05%, and manganese+molybdenum: 0.45 to 0.70% with the balance consisting of iron and unavoidable impurities, thereby producing a steel product having a hardness after rolling or forging of 85 to 97 HRB; and induction hardening the steel product to obtain a shaft having a hardening depth ratio (distance from the surface to a position of 500 HV/radius of component) of not less than 0.25 and an austenitic grain size number as specified in JIS G 0551 of not less than 7.

In order to inhibit the brittle fracture, 0.0005 to 0.005% of boron and 0.08 to 0.30% of molybdenum were added to improve the intergranular strength.

Further, 0.05 to 0.20% of titanium was added to finely precipitate titanium carbides or titanium carbonitrides in the steel. This reduced the ferrite grain size after rolling and inhibited the growth of austenitic grains in the course of quenching and tempering, such as induction quenching and tempering, thereby bringing the austenitic grain size number as specified in JIS to not less than 7. This contributed to the refinement of austenitic grains and improved intergranular strength. The addition of these additive elements in combination could inhibit the brittle fracture in a carbon content of 0.47 to 0.55%. Furthermore, in order to improve the machinability and cold workability, the contents of silicon and manganese, ferrite strengthening elements, were lowered. Further, the heating temperature in the rolling or forging was specified to finely precipitate titanium carbides or titanium carbonitrides, resulting in the refinement of austenitic grains at the time of rolling or forging to increase the percentage area of ferrite. These effects in combination brought the hardness after rolling or forging to 85 to 97 HRB and improved the machinability and cold workability.

DETAILED DESCRIPTION OF THE INVENTION

Figure 1:
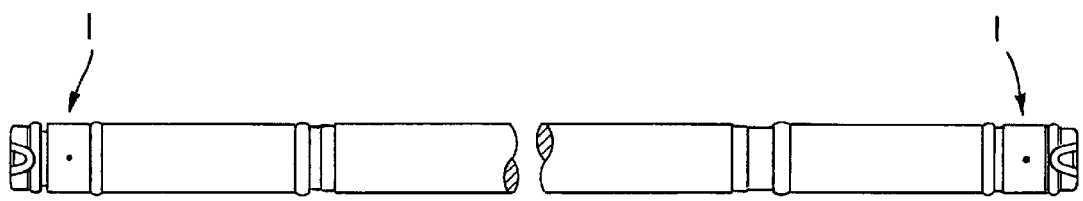
FIG. 1 is a diagram showing the shape of a shaft used in a torsional strength test and a torsional fatigue test.

According to the production process of the present invention, shafts having improved strength can be produced using a steel having the above chemical composition without sacrificing the machinability and cold workability.

The reasons for the limitation of chemical compositions of the steel products according to the present invention will be described. In the following description, "%" is by weight.

Carbon: Carbon is an element which is necessary for ensuring strength, as components for machine structural use, after quenching and tempering. When the content of carbon is less than 0.47%, the strength is unsatisfactory. On the other hand, a carbon content exceeding 0.55% results in transition of fracture mode from ductile fracture to brittle fracture and unfavorably lowers the strength. For this reason, the carbon content is limited to 0.47 to 0.55%.

Silicon: Silicon is an element which is necessary for deoxidation. When the content of silicon is less than 0.03%, the contemplated effect is unsatisfactory, while when the silicon content exceeds 0.15%, the workability is lowered. Therefore, the silicon content is limited to 0.03 to 0.15%.

Manganese: Manganese is an element necessary for ensuring the hardenability. When the content of manganese is less than 0.20%, the contemplated effect is unsatisfactory. When the manganese content exceeds 0.50%, the hardness after rolling or forging is increased, resulting in lowered workability. Therefore, the manganese content is limited to 0.20 to 0.50%.

Molybdenum: Molybdenum is an element which functions to improve the hardenability and is important for increasing the intergranular strength, inhibiting the brittle fracture, and changing the fracture mode from the brittle fracture to the ductile fracture. When the content of molybdenum is less than 0.08%, the brittle fracture inhibitory effect is unsatisfactory. On the other hand, a molybdenum content exceeding 0.30% increases the hardness after rolling or forging and significantly deteriorates the workability. For this reason, the molybdenum content is limited to 0.08 to 0.30%.

Sulfur: Sulfur is an element which is converted to MnS and TiS functioning to improve the machinability. When the content of sulfur is less than 0.005%, the contemplated effect is unsatisfactory. On the other hand, when the sulfur content exceeds 0.035%, the cold workability is deteriorated. Thus the sulfur content is limited to 0.005 to 0.035%.

Boron: Boron is an element which functions to improve the intergranular strength and, at the same time, to improve the hardenability. When the content of boron is less than 0.0005%, the contemplated effect is unsatisfactory, while a boron content exceeding 0.005% deteriorates the hardenability. For this reason, the boron content is limited to 0.0005 to 0.005%.

Titanium: Titanium is an element which fixes free nitrogen contained in the steel to improve the hardenability improvement effect of boron and, at the same time, functions to form titanium carbides and titanium carbonitrides, refine austenitic grains at the time of rolling or forging, and inhibit the growth of austenitic grains at the time of quenching and tempering, such as induction quenching and tempering, that is, titanium is an element necessary for improving the workability and intergranular strength. When the content of titanium is less than 0.05%, the contemplated effect is unsatisfactory. On the other hand, when the titanium content exceeds 0.20%, the amount of the precipitate becomes excessive, leading to deteriorated workability. Therefore, the titanium content is limited to 0.05 to 0.20%.

Nitrogen: Nitrogen, when it is present in an amount exceeding 0.01%, leads to an increased amount of TiN which adversely affects the fatigue properties. Thus, the nitrogen content is limited to not more than 0.015%.

Aluminum: Aluminum is an element which is necessary as a deoxidizer. When the content of aluminum is less than 0.005%, the contemplated effect is unsatisfactory. On the other hand, an aluminum content exceeding 0.05% results in an increased amount of alumina oxides and deteriorates fatigue properties and workability. For this reason, the aluminum content is limited to 0.005 to 0.05%.

Manganese+molybdenum: Both manganese and molybdenum are elements which contribute to the induction hardenability and, at the same time, function to increase the hardness of the steel product. When the total content of manganese and molybdenum is not more than 0.45%, a proper hardening depth for satisfying the torsional fatigue strength requirement cannot be obtained. On the other hand, when this total content is not less than 0.70%, the hardness requirement, a hardness of not more than 97 HRB, cannot be satisfied. For this reason, the total content of manganese and molybdenum is limited to 0.45 to 0.70%.

Hardness: When the hardness after rolling or forging is less than 85 HRB, the strength of the core portion (non-hardened portion after induction hardening) is unsatisfactory. On the other hand, when the hardness after rolling or forging is more than 97 HRB, the machinability is deteriorated. For this reason, the hardness after rolling or forging is limited to 85 to 97 HRB.

Rolling/forging conditions: At the time of rolling or forging, the alloy as a starting material is heated to $Ac_3$ or above in order to provide homogeneous austenitization without leaving carbides and ferrites. When ferrites are left after austenitization, an even microstructure of ferrite grain size cannot be obtained in the microstructure after rolling or forging. In this case, heat-treatment-induced distorsion after quenching and tempering is large. On the other hand, when the heating temperature is above 1050° C., fine precipitates are grown to a relatively large size. This causes austenite grain growth at the time of rolling or forging, reduces the ferrite content after rolling or forging, and deteriorates the workability. In addition, the grain size after quenching and tempering is increased, resulting in lowered intergranular strength. Therefore, the heating temperature at the time of rolling or forging is limited to $Ac_3$ to 1050° C. Regarding the reduction in area, a reduction in area of less than 30% reduces the amount of ferrites produced and deteriorates the workability.

Hardening depth: When the hardening depth ratio (distance from the surface to a position of 500 HV/radius of component) is less than 0.25, the fracture occurs from an internal origin, leading to lowered torsional fatigue strength in a torsional fatigue test. Thus, the hardening depth ratio is limited to not less than 0.25.

Austenitic grain size: When the austenitic grain size number after induction hardening is less than 7, the failure mode is changed from the ductile failure to the brittle failure, leading to lowered strength. Thus, the austenitic grain size number is limited to not less than 7.

EXAMPLES

Preferred embodiments of the present invention will be described with reference to the following examples and comparative examples. The chemical compositions of steels in the examples and comparative examples are shown in Nos. 1 to 8 of Table 1. Steel Nos. 1 to 3 of the invention respectively have the same chemical compositions as steels corresponding to S48C, S53C, and S55C, except that the content of silicon and the content of manganese have been lowered, molybdenum and boron have been added, and titanium has been added in a large amount of 0.08 to 0.142%. On the other hand, comparative steel Nos. 4 and 5 are respectively steels of S40C and S48C. Comparative steel No. 6 has the same chemical composition as a steel corresponding to S48C, except that the content of boron and the content of titanium have been added in an amount of 0.035%. Comparative steel No. 7 has the same chemical composition as a steel corresponding to S55C, except that molybdenum, boron, and titanium (0.038%) have been added. Steel No. 8 has the same chemical composition as a steel corresponding to S53, except that molybdenum, boron, and titanium (0.132%) have been added with manganese+molybdenum being 0.75%. That is, steel No. 8 does not satisfy a requirement of 0.40% ≦ manganese+molybdenum ≦0.70%.

100 kg of each of the test steels (steel Nos. 1 to 3 of the invention and comparative steel Nos. 4 to 7) having chemical compositions shown in Table 1 was produced by the melt process in a vacuum melting furnace. These steels were heated to 950° C., and hot forged into $\phi 27$. They were then machined and form rolled to obtain shafts having a shape shown in FIG. 1. The shafts were then subjected to induction quenching and tempering (tempering conditions: at 180° C. for one hr), so that the hardening depth ratio was about 0.50.

For the products thus obtained, the following tests were carried out. The results will be described.

Serrations 1 were fixed respectively to both ends of the shaft, and tested for torsional strength and torsional fatigue strength. The test piece for torsional strength is a test piece which, in the same manner as described above, has been induction quenched and tempered so that the hardening depth ratio became about 0.50. The grain size was measured according to the method specified in JIS G 0551. For the hardening depth, the hardness was measured with a Vickers hardness meter to determine a position of 500 HV, and the hardening depth ratio was then determined. The hardness of the material was measured with a Rockwell hardness meter.

(Hardness of Material and Results of Torsional Strength Test)

Test pieces having a hardening depth ratio after induction quenching and tempering of about 0.50 were tested for failure mode, torsional strength, surface hardness after induction quenching and tempering, austenitic grain size number, and material hardness. The results are shown in Table 2. The steels of the present invention had substantially the same surface hardness as the comparative steels having the same level of the carbon content. As compared with the comparative steels having the same level of the carbon content, the steels of the present invention had lower material hardness, better workability, were smaller in the size of austenite grains after induction quenching and tempering, were of ductile failure mode, and had higher strength. The comparative steel 8 had a high strength by virtue of the effect of molybdenum and titanium, but on the other had, the material hardness was 101 HRB, suggesting no good workability.

TABLE 1

|  | No. | C | Si | Mn | P | S | Cr | Mo | B | Ti | Al | N | (mass %) O |
|---|---|---|---|---|---|---|---|---|---|---|---|---|---|
| Steel of inv. | 1 | 0.49 | 0.07 | 0.45 | 0.015 | 0.019 | 0.16 | 0.12 | 0.0012 | 0.080 | 0.023 | 0.0057 | 0.0012 |
|  | 2 | 0.53 | 0.09 | 0.30 | 0.011 | 0.017 | 0.17 | 0.24 | 0.0013 | 0.142 | 0.019 | 0.0082 | 0.0008 |
|  | 3 | 0.55 | 0.10 | 0.38 | 0.012 | 0.018 | 0.14 | 0.20 | 0.0013 | 0.116 | 0.021 | 0.0055 | 0.0006 |
| Comp. steel | 4 | 0.41 | 0.25 | 0.85 | 0.012 | 0.019 | 0.16 | 0.01 | — | — | 0.027 | 0.0128 | 0.0009 |
|  | 5 | 0.48 | 0.20 | 0.83 | 0.013 | 0.020 | 0.15 | 0.02 | — | — | 0.025 | 0.0116 | 0.0008 |
|  | 6 | 0.49 | 0.09 | 0.65 | 0.013 | 0.020 | 0.17 | 0.01 | 0.0015 | 0.035 | 0.020 | 0.0050 | 0.0007 |
|  | 7 | 0.55 | 0.13 | 0.55 | 0.012 | 0.018 | 0.18 | 0.22 | 0.0014 | 0.038 | 0.023 | 0.0063 | 0.0008 |
|  | 8 | 0.53 | 0.10 | 0.50 | 0.011 | 0.016 | 0.015 | 0.25 | 0.0016 | 0.132 | 0.024 | 0.0054 | 0.0005 |

TABLE 2

| | No. | Material hardness, HRB | Surface hardness, HV | Hardening depth ratio | Austenitic grain size number | Torsional failure torque, kg · m | Failure form |
|---|---|---|---|---|---|---|---|
| Steel of inv. | 1 | 87 | 712 | 0.53 | 8.0 | 453 | Ductile failure |
| | 2 | 92 | 745 | 0.49 | 10.5 | 468 | Ductile failure |
| | 3 | 94 | 768 | 0.51 | 9.0 | 484 | Ductile failure |
| Comp. steel | 4 | 93 | 650 | 0.50 | 5.5 | 385 | Ductile failure |
| | 5 | 99 | 713 | 0.48 | 5.0 | 415 | Brittle failure |
| | 6 | 97 | 722 | 0.52 | 3.5 | 421 | Brittle failure |
| | 7 | 103 | 764 | 0.50 | 4.5 | 436 | Brittle failure |
| | 8 | 101 | 748 | 0.50 | 9.5 | 464 | Ductile failure |

(Relationship Between Hardening Depth Ratio and Torsional Fatigue Strength)

Next, for steel No. 2 of the invention, the hardening depth ratio after induction quenching and tempering was varied, and, under load torque 130 kg.m, a torsional fatigue test was carried out. The torsional fatigue strength was evaluated in terms of the number of repetitions of stress necessary for causing failure. The results are shown in Table 3. As is apparent from Table 3, for hardening depth ratios of 0.11 and 0.21, the fracture origin was an internal origin, and the fatigue strength was lower than that in the case of the surface origin. For the surface origin, in the hardening depth ratio range of 0.26 to 0.51, there is a tendency that the fatigue strength increases with increasing the hardening depth ratio.

TABLE 3

| Hardening depth ratio | 0.11 | 0.21 | 0.26 | 0.37 | 0.51 |
|---|---|---|---|---|---|
| Number of repetitions of stress | $9.4 \times 10^4$ | $1.1 \times 10^5$ | $2.2 \times 10^6$ | $2.6 \times 10^6$ | $3.3 \times 10^6$ |
| Failure origin | Internal | Internal | Surface | Surface | Surface |

As is apparent from the foregoing description, the process for producing a high strength shaft according to the present invention has the following effects.

1) The addition of 0.0005 to 0.005% of boron, 0.08 to 0.30% of molybdenum, and 0.05 to 0.20% of titanium in combination in the chemical composition of the steel could inhibit brittle fracture and realize the production of shafts having improved strength.

2) Limiting the content of molybdenum and manganese in the chemical composition of the steel, limiting rolling or forging conditions, and the addition of 0.05 to 0.20% of titanium could realize the production of shafts having improved workability.

3) Limitation of the hardening depth ratio in the induction hardening could realize the production of shafts having improved fatigue strength properties.

Thus, according to the process of the present invention, shafts having improved strength properties and fatigue strength properties can be produced without sacrificing machinability and cold workability. This contributes to a reduction in weight of automobile components and the like.

What is claimed is:

1. A process for producing a high strength shaft, comprising the steps of:

rolling or forging an alloy as a starting material at a heating temperature of $AC_3$ to 1050° C. with a reduction in area of not less than 30%, said alloy comprising by weight carbon: 0.47 to 0.55%, silicon: 0.03 to 0.15%, manganese: 0.20 to 0.50%, molybdenum: 0.08 to 0.30%, sulfur: 0.005 to 0.035%, boron: 0.0005 to 0.005%, titanium: 0.05 to 0.20%, nitrogen: not more than 0.01%, aluminum: 0.005 to 0.05%, and manganese+molybdenum: 0.45 to 0.70% with the balance consisting of iron and unavoidable impurities, thereby producing a steel product having a hardness after rolling or forging of 85 to 97 HRB; and induction hardening the steel product to obtain a shaft having a hardening depth ratio (distance from the surface to a position of 500 HV/radius of component) of not less than 0.25 and an austenitic grain size number as specified in JIS G 0551 of not less than 7.

2. A high strength shaft produced by the process according to claim 1.

* * * * *